United States Patent Office 3,276,887
Patented Oct. 4, 1966

3,276,887
ASPHALT EMULSIONS
Armin C. Pitchford, Bartlesville, Okla., assignor to Phillips Petroleum Company, a corporation of Delaware
No Drawing. Filed June 20, 1963, Ser. No. 289,418
10 Claims. (Cl. 106—277)

This is a continuation-in-part application of my application Serial No. 265,321, filed March 15, 1963, now abandoned.

This invention relates to asphalt emulsions. In another aspect it relates to slow-setting, acidic, oil-in-water cationic asphalt emulsions, slurries of such emulsions with siliceous aggregate, and methods of preparing and using such emulsions and slurries.

The use of asphalt emulsions in the construction and repair of roads, pavements, soil stabilization, and the like has become increasingly important since the end of World War II. A type of asphalt emulsion which recently has come into widespread use in large volumes for such purposes is the acidic, oil-in-water cationic asphalt emulsions. This type of emulsion is prepared with cationic-active emulsifying agents, such as a fatty diamine hydrochloride or a quaternary ammonium salt. These emulsions are very effective on electronegative aggregates, particularly siliceous aggregates. The cationic asphalt emulsions can be used as seal coats, or mixes with fine siliceous aggregates (e.g., crusher dust and/or sand) to form a slurry seal coat, or mixed with coarse aggregates in the construction and surfacing of pavements.

A problem encountered in the application of such cationic asphalt emulsions, however, is the tendency of such emulsions to be unstable and break down very rapidly and prematurely in the presence of the siliceous aggregates. Apparently, the cationic emulsifying agents have an attraction for the siliceous surfaces as well as the asphalt globules and the attraction for the former is so great that the breakdown or setting of the emulsion occurs altogether too rapidly upon contact with the siliceous aggregate. When the emulsion is contacted with the aggregate, the emulsion often breaks down in the mixer used to prepare the slurry before it can be applied to the road surface, with the result that the equipment used to prepare and apply the slurry plugs up and becomes inoperative. Even in those cases in which borderline operability of the equipment is obtained, the emulsion often breaks down shortly after being applied and before adequate penetration and strong bonding of the aggregate is obtained. As a result, water, such as runoff water from rains, attacks the asphalt and causes the asphalt to separate from the aggregate and wash away. Thus, there has arisen a need for an improved cationic asphalt emulsion which does not break too rapidly upon contact with siliceous material.

Accordingly, an object of this invention is to provide an improved asphalt emulsion. Another object is to provide a slow-setting, acidic oil-in-water cationic asphalt emulsion with a reduced tendency to break down prematurely upon contact with siliceous aggregate. Another object is to convert a rapid-setting cationic asphalt emulsion into a slow-setting cationic emulsion which is especially suitable for slurry seal work. Another object is to provide an improved slurry of a cationic asphalt emulsion and siliceous aggregate. Another object is to provide a method of preparing such emulsions. Another object is to provide a method of using such emulsions in paving and resurfacing roads and the like. Other objects and advantages of this invention will become apparent to those skilled in the art from the following disclosure and accompanying claims.

I have discovered that improved acidic, oil-in-water cationic emulsions can be prepared by employing select nonionic emulsifying agents of the general formula:

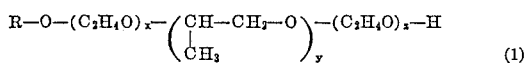
(1)

where:

R is selected from the group consisting of hydrogen, aryl, and alkylaryl radicals; and $x$, $y$ and $z$ are integers, such that (1) when $x$ is zero, $y$ is also zero, $z$ is in the range of 6 to 11, inclusive, and said R is one of said aryl and alkylaryl radicals, and (2) when $x$ and $y$ are each greater than zero, the sum of $x$ and $z$ is in the range of 20 to 40, inclusive, and $y$ is in the range of 40 to 60, inclusive.

The nonionic emulsifying agents are used in this invention in combination with conventional cationic emulsifying agents to provide asphalt emulsions which have mixing stability in the presence of siliceous aggregates. The term mixing time as used herein refers to the duration of time the emulsion is stable in a mixer when in contact with the siliceous aggregate. Because said nonionic emulsifiers serve to extend the mixing time, all the advantages of using cationic asphalt emulsions in paving, resurfacing, coating, etc., can be obtained.

The nonionic emulsifying agents which are used in this invention, as shown by the above general formula, represent a rather narrow class of compounds and they have a critical balance of hydrophobic components (propyleneoxy) and hydrophilic component (ethyleneoxy) which I have discovered is necessary to extend the mixing time of cationic asphalt emulsions. Within the general formula given above for these nonionic emulsifying agents, there are two preferred subclasses which can be represented by the following general formulas:

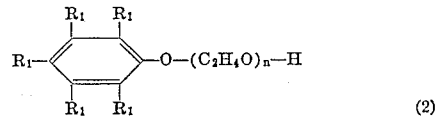
(2)

where $R_1$ is selected from the group consisting of hydrogen and alkyl hydrocarbon radicals (each such alkyl radicals preferably having 1 to 25 carbon atoms, and the total carbon atoms in the sum of such alkyl radicals preferably not exceeding 25), and $n$ is an integer in the range of 6 to 11, inclusive;

and

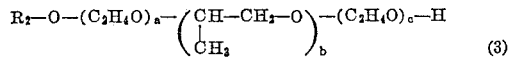
(3)

where $a$ and $c$ are integers greater than zero and whose sum is in the range of 20 to 40, inclusive, $b$ is an integer in the range of 40 to 60, inclusive, and $R_2$ is selected from the group consisting of hydrogen and the hydrocarbon radical

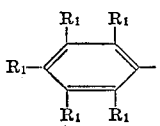

where $R_1$ is as defined above

Representative examples of the nonionic emulsifying agents which can be used in this invention include:

phenoxypenta(ethyleneoxy)ethanol,
phenoxyocta(ethyleneoxy)ethanol,
phenoxyennea(ethyleneoxy)ethanol,
phenoxydeca(ethyleneoxy)ethanol,
4-methylphenoxypenta(ethyleneoxy)ethanol,
2,3,6-triethylphenoxyhepta(ethyleneoxy) ethanol,
4(1,1,3,3-tetramethylbutyl)phenoxyhepta(ethyleneoxy)-ethanol,
4(1,3,5-trimethylhexyl)phenoxyhexa(ethyleneoxy)-ethanol,
4-nonylphenoxyhepta(ethyleneoxy)ethanol,
2,3,4,5,6-penta-n-pentylphenoxyennea(ethyleneoxy)-ethanol,
2(1,3,5-trimethylhexyl)-4(1,3-dimethylbutyl)phenoxy-penta(ethyleneoxy)ethanol,
4(3,5,5-trimethylheptyl)phenoxyhexa(ethyleneoxy)-ethanol,
3(3,5,7,7-trimethyl-5-ethylnonyl)phenoxyhepta-(ethyleneoxy)ethanol,
4(1,1,3,3,5,5,7,7-decamethyldecyl)phenoxyennea-(ethyleneoxy)ethanol,
4-n-pentacosylphenoxypenta(ethyleneoxy)ethanol,
3,5-di-n-decyl-4-n-pentylphenoxydeca(ethyleneoxy)-ethanol,
beta-hydroxyethyleneoxytetraconta(propyleneoxy)-octadeca(ethyleneoxy)ethanol,
beta-hydroxyethoxyoctadeca(ethyleneoxy)tetracontra-(propyleneoxy)ethanol,
beta-hydroxyethoxyennea(ethyleneoxy)pentaconta)-(propyleneoxy)deca(ethyleneoxy)ethanol,
beta-hydroxyethoxynonadeca(ethyleneoxy)hexacontra(propleneoxy)nonadeca(ethyleneoxy)ethanol,
beta-hydroxyethoxytetradeca(ethyleneoxy)pentatetra-conta(propyleneoxy)tetradeca(ethyleneoxy)ethanol,
phenoxyethyleneoxypentapentaconta(propyleneoxy)-octatriaconta(ethyleneoxy)ethanol,
4-methylphenoxyldeca(ethyleneoxy)nonatetraconta-(propyleneoxy)eicosa(ethyleneoxy)ethanol,
4(1,3,5-trimethylhexyl)phenoxyhexa(ethyleneoxy)-pentacontra(propyleneoxy)triconta-(ethyleneoxy)ethanol,
4-n-pentacosylphenoxypentacosa(ethyleneoxy)penta-conta(propyleneoxy)deca(ethyleneoxy)ethanol,
2,4,5-trimethylphenoxydeca(ethyleneoxy)pentaconta-(propyleneoxy)pentacosa(ethyleneoxy)ethanol,
2(1,3,5-trimethylhexyl)-4-(1,1,3,3-tetramethylbutyl)-phenoxyeicosa(ethyleneoxy)hexatetraconta(propyleneoxy)penta(ethyleneoxy)ethanol,
4-n-pentacosylphenoxyeicosa(ethyleneoxy)hexaconta-(propleneoxy)-nonatriaconta(ethyleneoxy)ethanol, and the like, and mixtures thereof.

Many of the nonionic emulsifying agents coming within the scope of the above disclosure are commercially available. These commercially available emulsifying agents include: Triton X–114 which is a mixture of octylphenoxy-poly(ethyleneoxy)ethanols with 7–8 ethyleneoxy groups in the poly(ethyleneoxy) chain; Neutronyx 600, 611 and 656, nonylphenoxypoly(ethyleneoxy)ethanols with 9–11 ethyleneoxy groups in the poly(ethyleneoxy) chain; Igepal CA–630, CO–610, and CO–710, nonylphenoxypoly-(ethyleneoxy)ethanols with 9–11 ethyleneoxy groups in the poly(ethyleneoxy) chain; and Pluronic L–103, $$HO(C_2H_4O)_a(C_3H_6O)_b(C_2H_4O)_cH,$$

where the sum of $a$ and $c$ is 30 and $b$ is about 56.

The cationic emulsifying agents which are used in combination with the above-described nonionic emulsifying agents in the practice of this invention include any of those known in the prior art. A particularly useful class of cationic emulsifying agents are salts of organic nitrogen bases characterized by the presence of at least one basic nitrogen atom in their cation portion, and where the latter contains a long-chain aliphatic hydrocarbon radical of at least 12 and as many as 24 carbon atoms, preferably a straight chain fatty aliphatic group. A particularly useful subclass of such cationic emulsifying agents are the tetra-substituted quaternary ammonium compounds, such as those of the general formula:

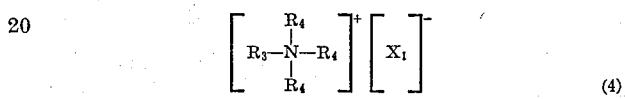

(4)

where $R_3$ is a long alkyl chain of at least 12 and as many as 24 carbon atoms, and the $R_4$'s are shorter alkyl radicals or benzyl radicals, the presence of which is sufficient to impart oil solubility and emulsifying properties to the salt material, and $X_1$ is a hydroxyl or an anion such as nitrate, sulfate, secondary phosphate, acetate, benzoate, salicylate and preferably a halogen, such as chlorine or bromine. Another particularly useful subclass of cationic emulsifying agents are the salts of heterocyclic nitrogen bases, such as alkyl pyridine, alkyl quinoline, alkylisoquinoline and alkyl imidazoline, a particularly useful group of the latter being represented by the general formula:

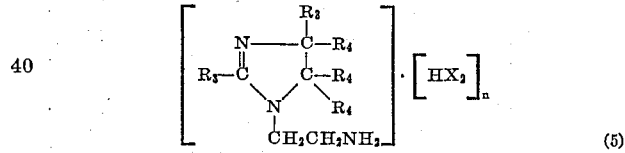

(5)

where $R_3$ and $R_4$ are as defined above and $X_2$ is an anion such as nitrate, sulfate, secondary phosphate, acetate, benzoate, sylicylate and preferably a halogen, such as chlorine and bromine, and $n$ is an integer of 1 or 2. Primary, secondary and tertiary monoamines and diamines are also useful in this invention, particularly the fatty acid diamines of the general formula $R_3NH(CH_2)_mNH_2$, where $R_3$ is as defined above and $m$ is an integer in the range of 1 to 3.

Representative cationic emulsifying agents which can be used in this invention include cetyl trimethylamine bromide, cetyl trimethylethylamine bromide, "tallow" trimethylamine chloride (the term "tallow" referring to the radical of a mixture of fatty acids derived from tallow), n-octyltrimethylammonium chloride,
n-decyltrimethylammonium bromide,
n-dodecyltriethylammonium hydroxide,
n-tetradecyltrimethylammonium chloride,
n-hexadecyltripropylammonium iodide,
n-octadecyltributylammonium nitrate,
9-octadecenyltriethylammonium chloride,
n-hexadecyltrimethylammonium chloride,
9,12-octadecadienyltrimethylammonium chloride,
9,12,15-octadecatrienyltrimethylammonium acetate,
di-n-decyldimethylammonium chloride,
di-n-octyldimethylammonium chloride,
di-n-decyldiethylammonium benzoate,
di-n-tetradecyldimethylammonium chloride,
di-n-octadecyldimethylammonium chloride,
di-n-heptadecyldipropylammonium chloride,
tri-n-octylmethylammonium chloride, di-n-hexadecyldimethylammonium chloride,
n-dodecylbenzyldimethylammonium chloride,
n-pentadecylbenzyldiethylammonium fluoride,
n-octadecylpropyldimethylammonium salicylate,
n-dodecyl-n-butylbenzylmethylammonium bromide,
n-nonadecyldiethylmethylammonium sulphate,
n-eicosyltrimethylammonium orthophosphate,
1-(2-aminoethyl)-2(4-tetradecenyl)4,5-di-n-butyl-2-imidazoline,
1-(2-aminoethyl)-2(1,1-diethyl-5,7-dodecadienyl)4,5-dimethyl-2-imidazoline,
1-(2-aminoethyl)-2-n-octadecyl-4-ethyl-2-imidazoline,
1-(2-aminoethyl)-2-n-eicosyl-2-imidazoline,
1-(2-aminoethyl)-2-(1,1-dimethyldecyl)2-imidazoline,
1-(2-aminoethyl)-2-(12-heptadecenyl)-2-imidazoline, and
1-(2-aminoethyl-2-(5,7-heptadecadienyl)-2-imidazoline, and the like, including mixtures thereof.

There are a number of commercially available cationic emulsifying agents which can be used in this invention, including: Nalcamine G–39M (the preferred cationic emulsifying agent of this invention), which is a mixture of 1-2-aminoethyl)-2-n-aliphatic-2-imidazolines where the aliphatic groups are heptadecenyl and heptadecadienyl; Hyamine 1622, octylphenoxyethoxyethyldimethylbenzylammonium chloride; Hyamine 2389, methyldodecylbenzyltrimethylammonium chloride; Hyamine 10–X, octylcresoxyethoxyethyldimethylbenzylammonium chloride; Nalquate G–8–12, 1-(2-oxyethyl)2-n-alkyl-1 (or 3)-benzyl-2-imidazolinium chlorides; Diam 11–C (n-alkyl-1,3-propylene amines); Aliquat 26 monotallowtrimethylammonium chloride; Alamine 26, primary tallow amine; Duomeen T, N-alkyltrimethylenediamine; and the like. In using such commercially available cationic emulsifying agents to form the emulsions of this invention, an acid can be employed, e.g., 0.05 to 1.0 weight percent based on the emulsion, to form the corresponding salt.

Asphalts which can be employed in the preparation of the novel cationic asphalt emulsions of this invention include any of those bituminous materials used heretofore and known in the prior art, such as natural asphalts or those derived from petroleum refining, for example by steam refining and/or air blowing, etc. Paving asphalts characterized by penetrations (ASTM D–5) from zero to about 300 or even higher, and preferably from about 40–300, and having softening points (ASTM D–36–26) in the range of 90° to 250° F., preferably 100° to 150° F., represent suitable asphalts which can be used.

Although not essential, other materials used in preparing the cationic asphalt emulsions, including such stabilizing agents as hydroxyethyl cellulose, aluminum chloride, and calcium chloride, can be used in preparing the emulsion to this invention.

The relative amounts of the various components of the asphalt emulsions of this invention can vary, but that given below will be found suitable:

| | General, Weight Percent | Preferred, Weight Percent |
|---|---|---|
| Asphalt | 50–70 | 60–65 |
| Cationic emulsifier | 0.1–2 | 0.25–0.4 |
| Nonionic emulsifier | 0.1–2 | 0.8–1 |
| Water | 50–25 | 32–39 |

In addition, an acid, such as hydrochloric acid, sulfuric acid, acetic acid, and sulfamic acid ($NH_2SO_3H$), can be incorporated into the asphalt emulsion to enhance the surface active properties of the cationic emulsifying agent and impart an acid pH below 7 to the emulsion. Generally, pH's in the range of 2 to about 6.5, preferably 3 to 5, are suitable for these acidic emulsions. The amount of the acid will generally be 0.1 to 1, preferably 0.2 to 1, weight percent of the emulsion, but can be considered and calculated as part of the cationic emulsifying agent. Sulfamic acid is especially useful where the asphalt used is of an aromatic nature and has an oil fraction which has an A.P.I. gravity not exceeding 15.5, and preferably not exceeding 15, and is useful where the asphalt emulsion must pass the modified miscibility test or the cement mixing test, which are described hereinafter.

The asphalt emulsions of this invention can be prepared by preparing a soap solution comprising water (either soft or hard) and the cationic emulsifying agent, which soap solution is then mixed in a colloid mill or the like with the asphalt phase, the latter being preferably heated to reduce its viscosity. The nonionic emulsifying agents of this invention can be added to the soap solution and/or to the asphalt, or can be added after emulsification of the asphalt, particularly after cooling the emulsion, or can be added in part of the soap solution or asphalt and in part after emulsification. Usually, the emulsifiers and many modifiers or promoters are dispersed in the water to form the soap solution, which is then warmed to a temperature of 90–200° F., preferably 90–125° F. The asphalt can be heated to a temperature in the range of 150–350° F., preferably 250–300° F. The warm soap solution and hot asphalt are then proportioned to a colloid mill to emulsify the mixture, during which milling the temperature of the mixture can be in the range of 100–210° F., preferably 150–200° F. The completed emulsion can then be cooled to a temperature below 150° F. before being used or transferred to storage. The method of preparing the emulsion will have some effect on the properties thereof, and the intended application or utility of the emulsion will dictate which particular method one should use to get the desired properties.

The asphalt emulsions of this invention can be applied in paving, resurfacing, coating, etc., and will produce good uniform and smooth coatings. The emulsion can be mixed with siliceous aggregate, for example in the ratio of 0.5–5 parts emulsion to 4–10 parts siliceous aggregate, and the resulting slurry applied to the surface desired to be treated. After such application, the slurry sets in the usual manner to provide an adhering coating. The aggregate to be used preferably has a moisture content in the range of 5 to 20 percent, and dry aggregate can be prewet to provide this moisture content. In the "slurry seal" technique, the moist sand can be mixed with the asphalt emulsion to form a slurry of a consistency similar to that of a Portland cement mix. This slurry can be continuously dumped from a revolving drum mixer or other suitable mixing device onto a road surface, and as the paving vehicle proceeds along the road a rubber drag apron can be used to smooth the slurry to a uniform thickness. For this purpose, a graded sand aggregate containing more than 10 percent fines passing a 200 mesh sieve is preferred. At least 1½ to 2 minutes will be usually required to mix the emulsion with the aggregate and spread the resulting slurry on the road surface before the emulsion breaks. In another application, the asphalt, emulsion, sand, and Portland cement or diatomaceous earth can be applied to surfaces as a mixture by the "gunnite" method, which is especially suited for coating canals, reservoirs, water ponds, dam facings, etc. Such application can be made with pneumatic-type spray equipment, such as a Refract-All Gun. Glass wool, rock wool, hemp, cotton, and other fibers can be added to the slurry or emulsion to provide coatings having higher tensile strength and which will not crack with shifting of the base or surface to which the coating is applied.

Further objects and advantages of this invention are illustrated in the following examples, but it should be understood that the various materials used and the amounts thereof, etc., recited in these examples are illustrative of preferred embodiments, and these examples should not be construed to unduly limit this invention.

In the examples which follow, the siliceous aggregate used in evaluation of various asphalt emulsions described therein was obtained from Baxter Springs, Kansas, and had the following characterization.

Sieve analysis:
    No. 10+, wt. percent _____ 2.2
    No. 20+ _____ 17.3
    No. 40+ _____ 33.0
    No. 60+ _____ 18.8
    No. 100+ _____ 15.3
    No. 200+ _____ 6.1
    No. 200− _____ 7.3
Surface area, No. 100− fines, m.²/gm. _____ <5
Composition (X-ray diffraction, 100− fines)
    α-Quartz, $SiO_2$ _____ +++
    Dolomite, $CaMg(CO_3)_2$ _____ +
    Calcite, $CaCO_3$ _____ +
    Calcium in total aggregate as percent
      $CaCO_3$ _____ 3.6

The mixing test used in the examples to evaluate the emulsions was that designed to simulate mixing in a slurry seal unit. The apparatus comprised a heavy 4-inch open container equipped with a 3-bladed paddle stirrer powered by a variable speed motor. The aggregate (100 gm.) was placed in the assembled vessel and while stirring at low speed the aggregate was wet with about 20 ml. water, after which the speed of the stirrer was increased to about 100 r.p.m. From about 18 to 20 gm. of the emulsion was added rapidly to the wet aggregate. A timer was started at the instant the emulsion contacted the aggregate, and the mixing time was recorded as the time the mix could be stirred before the emulsion broke, as evidenced by solidification of the mix.

The soap solutions used in the examples contained the emulsifying agents, stabilizer, acid, and water, and were prepared by weighing the components directly. Stabilizers in some cases were added and the pH of the aqueous phase was adjusted. Sufficient water was added to yield 350 gm. of soap solution. The soap solution was charged to the feed tank of a colloid mill, and while circulating through the mill 650 gm. of asphalt were added slowly to the system. After asphalt addition was complete, milling continued for 1–5 min., depending on the viscosity and appearance of emulsion. The following conditions were maintained during milling:

Asphalt temp., °F. _____ 220–280
Stator/rotor setting, in. _____ 0.003–0.005
Milling time, min. _____ 1–5
Milling temp., °F. _____ 185–200

After milling, the emulsions were stored in capped containers at room temperature for a minimum of 24 hrs. prior to testing.

*Example I*

In this example, a series of runs were made using the recipe of Table I.

TABLE I

|  | Weight percent |
|---|---|
| Nonionic emulsifier | 0.03 |
| Cationic emulsifier | 0.3 |
| HCl (anhydrous) | 0.06 |
| Hydroxyethylcellulose [1] | 0.02 |
| $CaCl_2$ | 0.1 |
| Water | 34.22 |
| Asphalt (150–200 pen.) | 65.00 |

[1] Natrosol 150-H.

The cationic emulsifying agent used in this series was Nalcamine G–39M. The nonionic emulsifying agents used were various Tritons, octylphenoxypoly(ethyleneoxy)ethanols, having poly(ethylenoxy) chains of varying length. The mixing time results of this series of runs are set forth in Table II.

TABLE II

| Run | No. of ethyleneoxy groups in nonionic emulsifier molecule | Mixing time, sec. |
|---|---|---|
| 1 [1] | | 4 |
| 2 | 1 | 7 |
| 3 | 3 | 5 |
| 4 | 5 | 4 |
| 5 | 5 | 5 |
| 6 | 7–8 | 130 |
| 7 | 12–13 | 6 |
| 8 | 12–13 | 16 |
| 9 | 16 | 6 |
| 10 | 30 | 3 |
| 11 | 40 | 3 |

[1] Run 1 was a control in which no nonionic emulsifier was used and in which the emulsion had a water content of 34.52 wt. percent.

The data of Table II show that the cationic emulsifier by itself (Run 1) did not give a long enough mixing time and that when it is used with a nonionic emulsifier, the latter must have a critical balance of hydrophylic and hydrophobic groups in order to obtain stability of the emulsion in the presence of siliceous aggregate. The octylphenoxypoly(ethleneoxy)ethanol having a poly(ethyleneoxy) chain of 7–8 ethyleneoxy groups (Run 6) resulted in an asphalt emulsion having a superior mixing time as compared with those obtained in the other runs using similar nonionic emulsifying agents having poly(ethyleneoxy) chains which were shorter and longer.

*Example II*

In this example, the recipe of Table I was again employed in preparing the asphalt emulsions. The cationic emulsifying agent used was the same as that in Example I, but the nonionic emulsifying agents used in this example were Pluronic nonionic emulsifying agents of the general formula

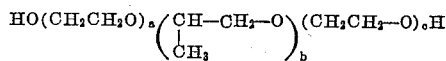

Results obtained on mixing the emulsions with siliceous aggregate are set forth in Table III

TABLE III

| Run | No. of hydrophobic groups in nonionic emulsifier molecule (b) | Sum of hydrophilic groups (a+c) | Mixing time, sec. |
|---|---|---|---|
| 1 | 30 | 4.1 | 3 |
| 2 | 30 | 4.1 | 4 |
| 3 | 56 | 8.2 | 21 |
| 4 | 47.4 | 15 | 13 |
| 5 | 56 | 30 | 120 |
| 6 | 56 | 42 | 26 |
| 7 | 56 | 49 | 4 |
| 8 | 56 | 74 | 60 |
| 9 | 56 | 296 | 15 |

The date shown in Table III again show a critical balance between hydrophilic and hydrophobic components is necessary to obtain a stable emulsion, i.e., a mixing time of suitable duration, the nonionic emulsifier used in Run 5 resulting in a superior mixing time as compared with those nonionic emulsifiers of the other runs.

*Example III*

In this example, a series of runs were made using Hyamine 1622 (octylphenoxyethoxyethyldimethylbenzylammonium chloride) as the cationic emulsifying agent and either Triton X–114 (with 7–8 ethyleneoxy groups) or Pluronic L–103 (with 30 ethyleneoxy groups and about 56 propyleneoxy groups) as the nonionic emulsifying agent. Hydrochloric acid (anhydrous) was used to obtain a desired pH. Mixing time results of this series of runs are set forth in Table IV.

TABLE IV

|  | Runs | | |
|---|---|---|---|
|  | 1 | 2 | 3 |
| Emulsion composition: | | | |
| Triton X-114, wt. percent | 0 | 0.3 | 0 |
| Pluronic L-103 | 0 | 0 | 0.3 |
| Hyamine 1622 | 0.3 | 0.3 | 0.3 |
| Natrosol 150-H | 0.02 | 0.02 | 0.02 |
| CaCl₂ | 0.1 | 0.1 | 0.1 |
| Water | 34.58 | 34.28 | 34.28 |
| Asphalt (150-200 pen.) | 65.0 | 65.0 | 65.0 |
| pH | 3.0 | 3.0 | 3.0 |
| Mixing time, sec | 3.5 | 240+ | 250+ |

The data of Table IV show the applicability of a different type of cationic emulsifying agent, namely a quaternary ammonium salt, can be used in preparing the asphalt emulsions with desirable mixing times.

*Example IV*

In this example, a series of runs were made using Hyamine 1622 as the cationic emulsifier and varying amounts of Triton X-114 as the nonionic emulsifier. Mixing time results are set forth in Table V.

TABLE V

|  | Runs | | | |
|---|---|---|---|---|
|  | 1 | 2 | 3 | 4 |
| Emulsion composition: | | | | |
| Triton X-114, wt. percent | 0 | 0.3 | 0.6 | 0.9 |
| Hyamine 1622 | 0.3 | 0.3 | 0.3 | 0.3 |
| Natrosol 150-H | 0.02 | 0 | 0 | 0 |
| CaCl₂ | 0.1 | 0 | 0 | 0 |
| HCl | 0.002 | Trace | Trace | Trace |
| Water | 34.58 | 35.0 | 35.0 | 35.0 |
| Asphalt (150-200 pen.) | 65.0 | 64.4 | 64.1 | 63.8 |
| Mixing time, sec | 3.5 | 120+ | 180+ | 240+ |

The data of Table V show that the mixing time of the asphalt emulsions can be increased by increasing the concentration of the nonionic emulsifier of this invention.

*Example V*

In this example, a series of runs were made which again show that an increase in mixing time of the asphalt emulsions of this invention can be obtained by increasing the amount of the nonionic emulsifying agent employed. In these runs either Nalcamine G-39M or Diam 11-C was used as the cationic emulsifying agent together with Triton X-114 as the nonionic emulsifying agent. Results are summarized in Table VI.

*Example VI*

In this example the asphalt emulsions recipe used is set forth in Table VII.

TABLE VII

Nonionic emulsifier _____ wt. percent__ 1.0
Cationic emulsifier _____ 0.2-0.35
Water _____ 29.7-32.7
Asphalt (150-120 pen.) _____ 66-69
CaCl₂ _____ 0-0.1

Different nonionic emulsifying agents of this invention were evaluated in combination with Nalcamine G-39-M (the cationic emulsifier). Results are set forth in Table VIII.

TABLE VIII

| Run | Nonionic emulsifier | Mixing time, sec. |
|---|---|---|
| 1 | Neutronyx 600 | 150+ |
| 2 | Neutronyl 605 | 150+ |
| 3 | Neutronyx 611 | 150+ |
| 4 | Neutronyl 656 | 150+ |
| 5 | Igepal CA-630 | 150+ |
| 6 | Igepal CO-610 | 150+ |
| 7 | Igepal CO-710 | 150+ |

*Example VII*

In this example, a number of asphalt emulsions of this invention were prepared using Nalcamine G-39-M as the cationic emulsifier, Triton X-114 as the nonionic emulsifier, sulfamic acid or hydrochloric acid to give an acid pH, asphalts A or B, whose compositions and properties are set forth in Table IX.

TABLE IX

|  | Asphalt A | Asphalt B |
|---|---|---|
| Asphaltenes, percent | 21.2 | 20.3 |
| Resins, percent | 14.0 | 20.3 |
| Oils, percent | 64.5 | 59.4 |
| Specific gravity, 60° F | 1.0269 | 0.9986 |
| A.P.I. gravity, 60/60° F | 6.3 | 10.2 |
| Resins, pen. 77° F | 27 | 36 |
| Resins, R & B, ° F | 128 | 128 |
| Resins, specific gravity | 1.0224 | 0.9958 |
| Resins, A.P.I. gravity, 60/60° F | 6.9 | 10.6 |
| Oils, A.P.I. gravity, 60/60° F | 13.9 | 16.6 |

Said emulsions were evaluated according to the above-described mixing test. In addition, they were evaluated according to the cement mixing and modified miscibility tests (ASTM D-2-60). The cement mixing test indicates the stability of an emulsion in the presence of Portland cement, a value of less than 2.5% indicating such stability. The modified miscibility test indicates the ability of an emulsion to withstand dilution with water without breaking and gives a measure of the overall stability of the emulsion, a modified miscibility of less than 4.5% indicating such stability.

TABLE VI

|  | Runs | | | | | | | | | |
|---|---|---|---|---|---|---|---|---|---|---|
|  | 1 | 2 | 3 | 4 | 5 | 6 | 7 | 8 | 9 | 10 |
| Emulsion Composition: | | | | | | | | | | |
| Triton X-114, wt. percent | 0 | 0.3 | 0.6 | 0.9 | ¹0.9 | 0 | 0.3 | 0.6 | 0.9 | ¹0.9 |
| Nalcamine G-39-M | 0.3 | 0.3 | 0.3 | 0.3 | 0.3 | 0 | 0 | 0 | 0 | 0 |
| Diam 11-C | 0 | 0 | 0 | 0 | 0 | 0.3 | 0.3 | 0.3 | 0.3 | 0.3 |
| HCl | 0.06 | 0.06 | 0.06 | 0.06 | 0.06 | 0.06 | 0.06 | 0.06 | 0.06 | 0.06 |
| Water | 35.44 | 35.34 | 35.24 | 35.14 | 35.74 | 35.44 | 35.34 | 35.24 | 35.14 | 35.74 |
| Asphalt (150-200 pen.) | 64.2 | 64.0 | 63.8 | 63.6 | 64.0 | 64.2 | 64.0 | 64.8 | 63.6 | 63.0 |
| Mixing time, sec | 3.5 | 45 | 120 | 140+ | 150+ | 2.5 | 5 | 11 | 150+ | 120+ |

¹ In runs 5 and 10, the Triton X-114 was added to the soap solution before emulsification of asphalt, while in the other runs where Triton X-114 was used it was added after the emulsification.

The method of preparing the emulsions used was to prepare a soap solution containing the cationic emulsifier and emulsify asphalt therewith, the nonionic emulsifier being incorporated in different ways. In preparing emulsion No. 1, the whole amount of the nonionic emulsifier was added to the asphalt before emulsification, in preparing emulsions Nos. 2, 7 and 14 it was added to the soap solution before emulsification, in preparing emulsions Nos. 3, 11 and 15 it was added to the finished emulsion, in preparing emulsions Nos. 4, 8 and 16 one-half of the whole amount of the nonionic emulsifier was added to the asphalt before emulsification and the other one-half was added to the finished emulsion, in preparing emulsions Nos. 5, 9, 12 and 17 one-half of it was added to the asphalt before emulsification and one-half to the soap solution, and in preparing emulsions Nos. 6, 10, 13 and 18 one-half of it was added to the soap solution and one-half to the finished emulsion. The compositions of the emulsions and their properties are set forth in Table X.

$x$, $y$ and $z$ are integers, such that (1) wherein $x$ is zero, $y$ is also zero, $z$ is in the range of 6 to 11, inclusive, and said R is one of said alkyl and alkylaryl radicals, and (2) wherein $x$ and $y$ are each greater than zero, the sum of $x$ and $z$ is in the range of 20 to 40, inclusive, and $y$ is in the range of 40 to 60, inclusive, said nonionic emulsifying agent being employed in an amount sufficient to extend the mixing time of said emulsion when the same is mixed with electronegative aggregate.

2. An acidic, oil-in-water asphalt emulsion comprising asphalt, water, a cationic emulsifying agent, and a nonionic emulsifying agent of the general formula

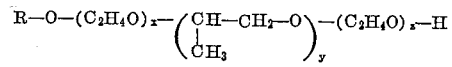

where:
R is selected from the group consisting of hydrogen, aryl, and alkylaryl radicals, and

TABLE X

| Emulsion | Composition, g. | | | | | Mixing time, sec. | Cement Mix test, percent | Modified miscibility, percent | Viscosity, SFS, 77° F. |
|---|---|---|---|---|---|---|---|---|---|
| | Asphalt | Cationic emulsifier | Nonionic emulsifier | Acid | Water | | | | |
| Using Asphalt A and sulfamic acid: | | | | | | | | | |
| 1 | 317 | 1.5 | 5.0 | 0.8 | 172.7 | 120+ | 5.1 | 3.9 | 44.9 |
| 2 | 330.5 | 1.5 | 5.0 | 0.8 | 173.5 | 120+ | 30 | 2.8 | |
| 3 | 342.7 | 1.5 | 5.0 | 0.8 | 173.5 | 120+ | 0.5 | Broke | 27.1 |
| 4 | 318.4 | 1.5 | 5.0 | 0.8 | 172.7 | 180+ | 3.8 | 3.8 | 100.2 |
| 5 | 326.8 | 1.5 | 5.0 | 0.8 | 173.5 | 180+ | 0.6 | 8.0 | 20.9 |
| 6 | 331.6 | 1.5 | 5.0 | 0.8 | 173.5 | 180+ | 5.4 | 3.4 | 40.9 |
| Using Asphalt A and hydrochloric acid: | | | | | | | | | |
| 7 | 649.4 | 3.0 | 10.0 | 0.6 | 336.4 | 120+ | 50+ | 3.7 | |
| 8 | 314.3 | 1.5 | 5.0 | 0.3 | 173.2 | 120+ | 30 | 3.3 | |
| 9 | 322.1 | 1.5 | 5.0 | 0.3 | 173.2 | 120+ | 30 | 3.2 | |
| 10 | 662.2 | 3.0 | 10.6 | 0.3 | 341.4 | 120+ | 40 | 3.4 | |
| Using Asphalt B and sulfamic acid: | | | | | | | | | |
| 11 | 300.0 | 1.5 | 5.0 | 0.8 | 172.7 | 180+ | 1.0 | Broke | 25.0 |
| 12 | 321.2 | 1.5 | 5.0 | 0.8 | 172.7 | 180+ | 0.4 | 8.5 | 41.4 |
| 13 | 316.6 | 1.5 | 10.0 | 0.8 | 172.7 | 180+ | 0.5 | 8.7 | 40.7 |
| Using Asphalt B and hydrochloric acid: | | | | | | | | | |
| 14 | 632.2 | 3.0 | 10.0 | 0.6 | 336.4 | 180+ | 2.7 | 1.2 | 374 |
| 15 | 640.8 | 3.0 | 10.0 | 0.6 | 342.4 | 180+ | 1.1 | 36 | |
| 16 | 642.4 | 3.0 | 10.0 | 0.6 | 346.4 | 180+ | 1.0 | 8.9 | 49.5 |
| 17 | 636.4 | 3.0 | 10.0 | 0.6 | 341.4 | 180+ | 1.6 | 2.6 | 74 |
| 18 | 630.0 | 3.0 | 10.0 | 0.6 | 341.4 | 200+ | 1.0 | 1.3 | 5,100 |

The data of Table X show that all emulsions had extended mixing times, some of them passed the cement mix test (making them useful, for example, in slurry seal coating), and some passed the modified miscibility test (making them useful, for example, in seal coating work where field dilution may be required to adapt them to particular equipment requirements). Note also that when the sulfamic acid was used with the more aromatic asphalt A, the emulsions had better (i.e., lower) cement mix test values.

Various modifications and alterations of this invention will become apparent to those skilled in the art from the foregoing disclosure and examples, and it should be understood that this invention is not to be limited unduly to the preferred embodiments set forth herein.

I claim:
1. An oil-in-water asphalt emulsion comprising asphalt, water, a cationic emulsifying agent, and a nonionic emulsifying agent of the general formula

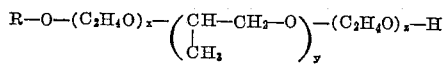

where:
R is selected from the group consisting of hydrogen, aryl, and alkylaryl radicals, and
$x$, $y$ and $z$ are integers, such that (1) wherein $x$ is zero, $y$ is also zero, $z$ is in the range of 6 to 11, inclusive, and said R is one of said alkyl and alkylaryl radicals, and (2) wherein $x$ and $y$ are each greater than zero, the sum of $x$ and $z$ is in the range of 20 to 40, inclusive, and $y$ is in the range of 40 to 60, inclusive, said nonionic emulsifying agent being employed in an amount sufficient to extend the mixing time of said emulsion when the same is mixed with siliceous aggregate.

3. The asphalt emulsion of claim 2, wherein the amount of said asphalt is 50 to 70 weight percent, the amount of said cationic emulsifying agent is 0.1 to 2 weight percent, the amount of said nonionic emulsifying agent is 0.1 to 2 weight percent, and the amount of said water is 25 to 50 weight percent.

4. The asphalt emulsion of claim 3, wherein said emulsion further comprises 0.1–1.0 weight percent hydrochloric acid which is sufficient hydrochloric acid to impart a pH of less than 7.

5. The asphalt emulsion of claim 3, wherein said emulsion further comprises 0.1–1.0 weight percent sulfamic acid which is sufficient sulfamic acid to impart a pH of less than 7.

6. The asphalt emulsion of claim 3, wherein said cationic emulsifying agent is a mixture of 2-n-heptadecenyl- and 2-n-heptadecadienyl-2-imidazolines, and where said nonionic emulsifying agent is octylphenoxypoly(ethyleneoxy)ethanol having 7 to 8 ethyleneoxy groups.

7. The asphalt emulsion of claim 3, wherein said cationic emulsifying agent is a mixture of 1-(2-aminoethyl)-2-n-heptadecenyl-2-imidazoline and 1-(2-aminoethyl)-2-n-heptadecadienyl-2-imidazoline, and where said nonionic emulsifying agent has the formula $$HO(C_2H_4O)_a(C_3H_6O)_b(C_2H_4O)_cH$$

where the sum of $a$ and $c$ is about 30 and $b$ is about 56.

8. A composition comprising a slurry of electronegative aggregate and an oil-in-water asphalt emulsion comprising asphalt, water, a cationic emulsifying agent, and a nonionic emulsifying agent of the general formula $$R-O-(C_2H_4O)_x-\left(\begin{array}{c}CH-CH_2-O\\|\\CH_3\end{array}\right)_y-(C_2H_4O)_z-H$$

where:
R is selected from the group consisting of hydrogen, aryl, and alkylaryl radicals, and
$x$, $y$ and $z$ are integers, such that (1) wherein $x$ is zero, $y$ is also zero, $z$ is in the range of 6 to 11, inclusive, and said R is one of said alkyl and alkylaryl radicals, and (2) wherein $x$ and $y$ are each greater than zero, the sum of $x$ and $z$ is in the range of 20 to 40, inclusive, and $y$ is in the range of 40 to 60, inclusive,
said nonionic emulsifying agent being employed in an amount sufficient to extend the mixing time of said emulsion when the same is mixed with electronegative aggregate.

9. A method of extending the mixing time of a cationic asphalt emulsion, which comprises admixing with said emulsion a nonionic emulsifying agent of the general formula $$R-O-(C_2H_4O)_x-\left(\begin{array}{c}CH-CH_2-O\\|\\CH_3\end{array}\right)_y-(C_2H_4O)_z-H$$

where:
R is selected from the group consisting of hydrogen, aryl, and alkylaryl radicals, and
$x$, $y$ and $z$ are integers, such that (1) wherein $x$ is zero, $y$ is also zero, $z$ is in the range of 6 to 11, inclusive, and said R is one of said alkyl alkylaryl radicals, and (2) wherein $x$ and $y$ are each greater than zero, the sum of $x$ and $z$ is in the range of 20 to 40, inclusive, and $y$ is in the range of 40 to 60, inclusive.

10. A method of coating a surface, which comprises admixing siliceous aggregate with an oil-in-water asphalt emulsion comprising asphalt, water, a cationic emulsifying agent, and a nonionic emulsifying agent of the general formula $$R-O-(C_2H_4O)_x-\left(\begin{array}{c}CH-CH_2-O\\|\\CH_3\end{array}\right)_y-(C_2H_4O)_z-H$$

where:
R is selected from the group consisting of hydrogen, aryl, and alkylaryl radicals, and
$x$, $y$ and $z$ are integers, such that (1) wherein $x$ is zero, $y$ is also zero, $z$ is in the range of 6 to 11, inclusive, and said R is one of said alkyl and alkylaryl radicals, and (2) wherein $x$ and $y$ are each greater than zero, the sum of $x$ and $z$ is in the range of 20 to 40, inclusive, and $y$ is in the range of 40 to 60, inclusive,
said nonionic emulsifying agent being employed in an amount sufficient to extend the mixing time of said emulsion when the same is mixed with said aggregate, and applying a layer of the resulting slurry to said surface.

References Cited by the Examiner

UNITED STATES PATENTS

| | | | |
|---|---|---|---|
| 2,901,369 | 8/1959 | Pordes | 106—122 |
| 3,050,468 | 8/1962 | Wright | 252—311.5 |
| 3,108,441 | 10/1963 | Watson | 106—287 |
| 3,110,604 | 11/1963 | McConnaughay | 106—277 |
| 3,126,350 | 3/1964 | Borgfeldt | 106—277 XR |

ALEXANDER H. BRODMERKEL, *Primary Examiner.*

MORRIS LIEBMAN, *Examiner.*

J. B. EVANS, *Assistant Examiner.*